United States Patent
Baumgardner et al.

(10) Patent No.: US 9,605,153 B2
(45) Date of Patent: *Mar. 28, 2017

(54) STABLE EMULSIONS FOR PRODUCING POLYMER MODIFIED ASPHALT

(71) Applicant: A.L.M. Holding Company, Onalaska, WI (US)

(72) Inventors: Gaylon L. Baumgardner, Jackson, MS (US); Gerald H. Reinke, La Crosse, WI (US)

(73) Assignees: A.L.M. Holding Company, Onalaski, WI (US); Ergon Asphalt & Emulsions, Inc., Jaskson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,023

(22) Filed: Mar. 27, 2015

(65) Prior Publication Data

US 2015/0259533 A1 Sep. 17, 2015

Related U.S. Application Data

(63) Continuation of application No. 14/026,625, filed on Sep. 13, 2013, now Pat. No. 8,993,657, which is a continuation of application No. 13/121,817, filed as application No. PCT/US2009/059282 on Oct. 1, 2009, now Pat. No. 8,536,255.

(60) Provisional application No. 61/101,942, filed on Oct. 1, 2008.

(51) Int. Cl.
| | |
|---|---|
| *C08L 95/00* | (2006.01) |
| *E01C 7/18* | (2006.01) |
| *E01C 7/26* | (2006.01) |
| *E01C 21/00* | (2006.01) |
| *E01C 7/24* | (2006.01) |
| *C08K 3/32* | (2006.01) |
| *C08K 5/17* | (2006.01) |
| *C08L 9/06* | (2006.01) |

(52) U.S. Cl.
CPC .............. *C08L 95/005* (2013.01); *E01C 7/18* (2013.01); *E01C 7/182* (2013.01); *E01C 7/24* (2013.01); *E01C 7/265* (2013.01); *E01C 21/00* (2013.01); *C08K 3/32* (2013.01); *C08K 5/17* (2013.01); *C08L 9/06* (2013.01); *C08L 2201/52* (2013.01); *C08L 2555/60* (2013.01); *C08L 2555/80* (2013.01)

(58) Field of Classification Search
CPC ..................................... C08L 95/005
USPC .............................. 524/60, 61, 68
See application file for complete search history.

(56) References Cited

U.S. PATENT DOCUMENTS

| | | |
|---|---|---|
| 4,073,759 A | 2/1978 | Lowry et al. |
| 4,772,648 A | 9/1988 | Demangeon et al. |
| 4,882,373 A | 11/1989 | Moran |
| 5,070,123 A | 12/1991 | Moran |
| 5,925,695 A | 7/1999 | Ohtsuka et al. |
| 6,031,029 A | 2/2000 | Baumgardner et al. |
| 6,117,926 A | 9/2000 | Engber et al. |
| 6,228,909 B1 | 5/2001 | Baumgardner et al. |
| 6,414,056 B1 | 7/2002 | Puzic et al. |
| 7,160,935 B2 | 1/2007 | Prejean |
| 7,226,501 B2 | 6/2007 | Thorstensson et al. |
| 7,608,142 B2 | 10/2009 | Thorstensson et al. |
| 8,536,255 B2 * | 9/2013 | Baumgardner ............... 106/277 |
| 8,993,657 B2 * | 3/2015 | Baumgardner ........... E01C 7/24 |
| | | 524/60 |
| 2006/0219135 A1 | 10/2006 | Thorstensson et al. |
| 2006/0293420 A1 | 12/2006 | Prejean et al. |
| 2008/0127858 A1 | 6/2008 | Thorstensson et al. |
| 2008/0194738 A1 | 8/2008 | Crews et al. |

FOREIGN PATENT DOCUMENTS

| | | |
|---|---|---|
| CN | 1856546 | 11/2006 |
| CN | 101203570 | 6/2008 |
| EP | 0854235 | 7/1998 |
| JP | 54-023691 | 8/1979 |
| JP | 2000-169718 | 6/2000 |

OTHER PUBLICATIONS

International Search Report, PCT/US2009/059282, mailed Jan. 29, 2010.

* cited by examiner

*Primary Examiner* — Edward Cain
(74) *Attorney, Agent, or Firm* — Kagan Binder, PLLC

(57) ABSTRACT

An acid modified asphalt binder is combined with an emulsifier solution to produce an emulsified asphalt binder. The acid modified asphalt binder may be formed by combining an asphalt binder, a phosphorous-based acid, and, optionally, a polymer modifier. The emulsifier solution may be produced by forming an aqueous solution of an amine and a phosphorous-based acid, which forms an aqueous solution comprising an amine phosphate. The emulsified asphalt binder may be combined with an aggregate to form a paving material. In other examples, the emulsified asphalt binder may be used alone, for example in a chip seal application, or in a diluted form, for example in a fog seal application.

20 Claims, 2 Drawing Sheets

STABLE EMULSIONS FOR PRODUCING POLYMER MODIFIED ASPHALT

CROSS-REFERENCE TO RELATED APPLICATION

The present application is a continuation of U.S. application Ser. No. 14/026,625, filed Sep. 13, 2013, entitled "STABLE EMULSIONS FOR PRODUCING POLYMER MODIFIED ASPHALT" which is a continuation of U.S. application Ser. No. 13/121,817, filed Jun. 14, 2011, entitled "STABLE EMULSIONS FOR PRODUCING POLYMER MODIFIED ASPHALT" which claims the benefit of PCT/US2009/059282, filed Oct. 1, 2009, entitled "STABLE EMULSIONS FOR PRODUCING POLYMER MODIFIED ASPHALT" which claims the benefit of U.S. Provisional Application Ser. No. 61/101,942, filed Oct. 1, 2008, entitled "STABLE EMULSIONS FOR PRODUCING POLYMER MODIFIED ASPHALT", all of which are incorporated herein by reference in their entirety.

BACKGROUND

Asphalt binders or cements are used in a wide variety of paving products. For example, some asphalt binders are used together with an aggregate to produce a pavement material, while other asphalt binders are used without aggregate to seal or coat surfaces.

Asphalt binders generally comprise residue from commonly used petroleum refining processes. In many asphalt binders, property-enhancing additives are added to the residue in order to alter the properties of the asphalt binder. In addition, in some cases, the asphalt binder is emulsified prior to use. The emulsification process reduces the temperature at which an asphalt binder can be utilized by reducing the handling viscosity of the asphalt binder. The emulsification typically uses a high shear colloid mill or other mechanical equipment that is capable of reducing the bulk asphalt liquid to very small particles (typically 4 to 20 micrometers). The emulsification requires the asphalt binder to be at a temperature where the viscosity can be processed by the available equipment. A surfactant solution is used that is capable of dispersing the fine asphalt particles of the binder into the surfactant solution and maintaining the asphalt particles in the dispersed state indefinitely at temperatures above freezing.

A large variety of property-enhancing additives may be used to alter the properties of the asphalt binder depending on the desired application. Some property-enhancing additives react with the asphalt to affect the properties of the base asphalt material, producing a modified asphalt. For example, certain polymers may be added to the asphalt binder, producing a polymer-modified asphalt (PMA) binder. In other examples, certain acids are added to the asphalt binder, producing an acid-modified asphalt binder. In some instances, emulsifying such modified asphalt binders presents unique challenges, both in maintaining an emulsion and in maintaining the properties of the modified asphalt binder after emulsification.

SUMMARY

In some embodiments of the present invention, an asphalt binder comprising a stable emulsion is formed from an acid modified asphalt binder, an amine phosphate, and water. The acid modified asphalt binder may be a polymer modified asphalt binder. The stable emulsions preserve or enhance the percent recovery, non-recovery compliance, elasticity, and stiffness properties of the acid modified asphalt binder.

In other embodiments of the present invention, a method of forming an emulsified asphalt binder material comprises forming a base asphalt binder material by combining an asphalt binder and polyphosphoric acid (PPA), mixing an amine compound and a phosphorous-based acid in water to form an emulsifier solution including an amine phosphate, and mixing the base asphalt binder and the base emulsion to form the emulsified asphalt binder. In some embodiments, the base asphalt binder may be a polymer modified asphalt binder.

In yet other embodiments of the invention, a road pavement is made by combining an acid modified asphalt binder with an emulsifier solution comprising an amine phosphate to form an asphalt emulsion, combining the asphalt emulsion with an aggregate material to form a paving material, and compacting the paving material. In some embodiments, the acid modified asphalt binder may be a polymer modified asphalt binder.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
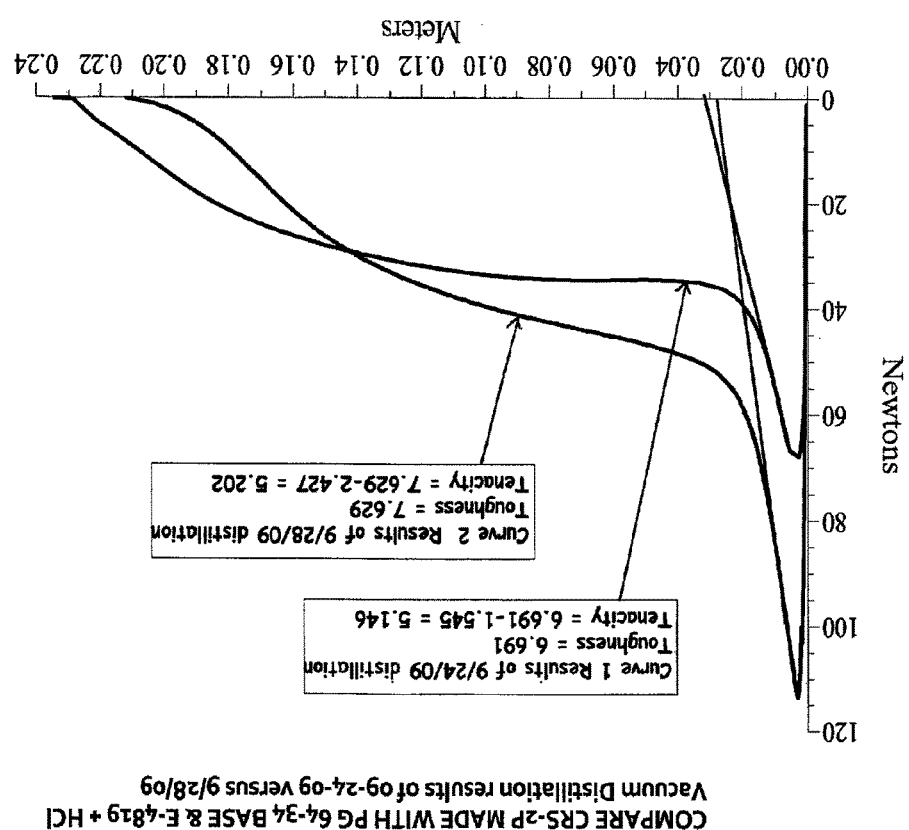
FIGS. 1 and 2 are graphs showing toughness and tenacity test results according to several asphalt syntheses described below.

In some embodiments of the present invention, a modified asphalt binder is formed as a water-based emulsion. The emulsion is formed by emulsifying a base asphalt material in an emulsifier solution. The base asphalt may be an acid modified asphalt. In some embodiments, the acid modified asphalt is also modified by a polymer along with the acid to form a polymer modified asphalt. Representative examples of acid modified asphalts are provided in U.S. Pat. Nos. 4,882,373; 5,070,123; 6,031,029; and 6,228,909, as well as in other U.S. patents provided below.

Acid modifiers or blends of modifiers, when combined with the asphalt binder, may increase the stiffness of the asphalt material. The one or more acids in the base asphalt may include phosphorous-based acids such as polyphosphoric acid or superphosphoric acid, both of which are anhydrous, or phosphoric acid, or may include other mineral acids, or any combination thereof.

The amount of acid modifier may be adjusted to achieve the desired level of stiffness of the asphalt binder. Also, the amount of acid may be maintained below the level at which the asphalt binder will gel. In some embodiments, the amount of acid used is from about 0.1% to about 2%, from about 0.1% to about 1%, from about 0.1% to about 0.7%, from about 0.1% to about 0.5%, from about 0.5% to about 2%, or from about 0.5% to about 1%, by total weight of the base asphalt.

Other additives may also be used in the asphalt binder. For example, other suitable components for the base asphalt are provided in U.S. Pat. No. 6,117,926, entitled "Acid Reacted Polymer-Modified Asphalt Compositions and Preparation Thereof," issued on Sep. 12, 2000; U.S. Pat. No. 6,228,909, entitled "Asphalt Compositions and Methods or Preparation Thereof," issued May 8, 2001; and U.S. Pat. No. 7,160,935, entitled "Tubular Reactor Ethylene/Alkyl Acrylate Copolymer as Polymeric Modifiers for Asphalt," issued Jan. 9, 2007. All of these patents are herein incorporated by reference in their entirety.

In embodiments in which the modified asphalt is a polymer modified asphalt, the base asphalt may be formed by combining an asphalt binder, one or more acids (e.g., any of the acids or combinations of acids mentioned above), and one or more polymeric modifiers. Polymeric modifiers or blends of modifiers, when combined with the asphalt binder, may yield improved resistance to high temperature thermal deformation, improved resistance to fatigue cracking under repeated loadings, and, in some instances, the ability to use reduced amounts of paving materials without loss of desired properties. The polymer modifier or blend of modifiers may include non-elastomeric or elastomeric polymers or a blend thereof.

Examples of the polymeric modifiers are ethylene-containing polymers such as ethylene-vinyl-acetate (EVA) and the ELVALOY™ series of polymers from DuPont; and styrene-containing polymers such as styrene-butadiene-styrene (SBS) and styrene-butadiene (SB). Any combination of these polymers may also be used as the polymer modifier, for example an ELVALOY™ polymer with a SBS polymer. In some embodiments, the polymeric modifier is a polymer that is produced at least in part from glycidyl methacrylate (GMA) monomer. Several varieties of the ELVALOY™ polymers from DuPont are produced at least in part from GMA monomer. For example, some ELVALOY™ polymers are produced at least in part from ethylene and GMA monomer. Other examples are ELVALOY™ AM polymers that are reactive elastomeric terpolymers (RETs), produced in part from ethylene, n-butylacrylate, and GMA monomer.

In some embodiments, the base asphalt has from about 0.4% to about 5%, from about 0.4% to about 3%, or from about 1% to about 2%, polymer modifier or blend of polymer modifiers (e.g., a GMA-based polymer such as an ELVALOY™ or other suitable modifier as discussed above) by weight, based on the weight of the base asphalt. The amount of polymer modifier added to the base asphalt depends on the type of asphalt binder being used and also depends on the desired characteristics of the modified asphalt binder. For example, the amount of polymer modifier may be adjusted to achieve the desired elasticity and viscosity of the polymer modified asphalt binder.

In the case of polymer modified asphalt, the amount of acid used with the polymer modifier may be from about 0.1% to about 2%, from about 0.1% to about 1%, from about 0.1% to about 0.7%, or from about 0.1% to about 0.5%, acid (e.g., polyphosphoric acid or any other acid mentioned above) by weight, based on the weight of the base asphalt. Sufficient acid is added to the base asphalt to provide one or more improved properties (e.g., the desired integrity to the base asphalt) without causing the base asphalt to gel. In some embodiments, the remainder of the base asphalt is the asphalt binder or cement, although the base asphalt may contain other possible additives, for example as described in U.S. Pat. Nos. 6,117,926; 6,228,909; and 7,160,935.

Mixing the asphalt binder, the polymer modifier and the acid component causes the acid component to react with the asphalt binder and/or the polymer, changing the properties of the asphalt binder. In some embodiments, the polymer modifier may provide greater elasticity or other properties to the modified asphalt.

The emulsifier solutions are aqueous solutions that include an amine phosphate. In some embodiments, the amine phosphate is produced by combining an amine and a phosphorous-based acid in water to form the emulsifier solution. In some embodiments, the emulsifier solution is prepared separately from the base asphalt. The components of the emulsifier solution may be mixed together at temperatures of 70-200° F. (21-93° C.), 100-180° F. (38-82° C.), or 120-160° F. (49-71° C.) for sufficient time to fully react the amine with the acid. This time can be as short as 15 minutes but could be as long as 1 hour or more depending on water temperature. A target solution pH of 0.5 to 6, 1.5 to 4 or 1.5 to 2.5 is generally suitable to produce an effective emulsifying solution. In other embodiments, all or a portion of the amine is added to the base asphalt and the desired amount of phosphorous-based acid component required to react the amine is added to the water. The amine treated base asphalt is then delivered to high shear dispersion equipment and the water with the phosphorous-based acid is also delivered to the high shear dispersion equipment and amine phosphate is formed in situ as the base asphalt is sheared into fine particles at which point the fine asphalt particles are stabilized to form the emulsion.

As used herein, an "amine" includes compounds with one or more amine functional groups. For example, amines include primary amines, secondary amines, monoamines, diamines, triamines, vegetable-oil based amines, ethoxylated amines, polyamines, amidoamines, imidazolines, or other suitable compounds with one or more amine functional groups. Representative examples of such compounds include ethoxylated tallow diamines such as CORSATHOX DT-3™ or CORSATHOX DM-3™ manufactured by Corsicana Chemical and E-6™ manufactured by Akzo Nobel, polyamines such as REDICOTE C-450™ also manufactured by Akzo Nobel, and blends of amines such as REDICOTE 4819™, which is a blend of an ethoxylated tallow diamine and a primary amine.

Any suitable phosphorous-based acid may be used to produce the amine phosphate. Examples of suitable phosphorous-based acids are phosphoric acid, polyphosphoric acid, or superphosphoric acid. In some embodiments, the pH of the emulsifier solution is maintained in a desired range. For example, the emulsifier solution desirably includes sufficient phosphorous-based acid so that the pH of the emulsifier solution is from about 1.5 to about 5, from about 2 to about 3, or about 2. In some embodiments, phosphorous-based acid is phosphoric acid that is introduced in an aqueous solution of about 75% phosphoric acid, or from about 65% to about 95% phosphoric acid, based on the aqueous acid solution. Where polyphosphoric and/or superphosphoric acids are used, these acids may be pre-processed by mixing them in water for a sufficient time to hydrolyze the polyphosphoric and/or superphosphoric acid before being used in the emulsifier solution. In some embodiments, the emulsifier solution has an amount of phosphorous-based acid that is from about 0.3 to about 2 times, from about 0.3 to about 1.1 times, from about 0.3 to about 0.9 times, from about 0.3 to about 0.7 times, or from about 0.7 to about 0.9, or about 0.5 times, the amount of amine by weight.

The remainder of the emulsifier solution may be water, although the emulsifier solution may also contain other possible additives to aid in processing or to modify the properties of the asphalt.

As discussed in more detail below, the emulsifier solution is then blended with the base asphalt and the blend is emulsified to form an emulsified asphalt binder. In some embodiments, the amount of amine phosphate in the emulsifier solution is sufficient to provide from about 0.1% to about 2.5%, or from about 0.5% to about 2%, amine phosphate by weight of total emulsion in the emulsified asphalt binder. In some embodiments in which the amine phosphate in the emulsifier solution is produced from an ethoxylated tallow diamine (e.g., DT-3, DM-3, or E-6), a sufficient amount of the ethoxylated tallow diamine is added to the emulsifier solution to yield about 1%, from about 0.1% to about 2%, from about 0.2% to about 2%, or from about 0.25% to about 1%, of ethoxylated tallow diamine phosphate by weight in the emulsified asphalt binder. In some embodiments in which the amine phosphate in the emulsifier solution is a polyamine phosphate (e.g., C-450), a sufficient amount of the polyamine phosphate may be, for example, added to the emulsifier solution to yield about 1.5%, about 2.5% or less, from about 0.5% to about 2.5%, or from about 1.5% to about 2.5%, polyamine phosphate by weight in the emulsified asphalt binder.

In some embodiments, an emulsifier solution (e.g., any of the emulsifier solutions described herein) is combined with a base asphalt (e.g., any of the base asphalts described herein) to form an emulsified modified asphalt binder. The base asphalt may be prepared at a temperature of about 320° F. (160° C.), between about 280° F. (138° C.) and about 400° F. (204° C.), between about 320° F. (160° C.) and about 370° F. (188° C.), or between about 320° F. (160° C.) and about 360° F. (182° C.), and the emulsifier solution may be prepared at a temperature of about 100° F. (38° C.), between about 80° F. (27° C.) and about 120° F. (49° C.), or between about 50° F. (10° C.) and about 140° F. (60° C.). When the base asphalt and the emulsifier solution are combined, the resulting emulsified modified asphalt binder may have a temperature above or below 212° F. (100° C.) (about the boiling point of water at standard atmospheric pressure). When the modified asphalt binder has a temperature above 212° F. (100° C.), the resulting modified asphalt binder may be kept under pressure to prevent the vaporization of the water and the undesirable breaking of the modified asphalt binder emulsion. In any case, the modified asphalt binder may be run through a heat exchanger or other device or operation in order to reduce the temperature of the modified asphalt binder below the boiling point of water.

In some embodiments, the emulsifier solution is combined with the base asphalt to yield an emulsion having from about 60% to about 75% non-volatile materials and solids, or about 70% non-volatile materials and solids depending on the particular application. For example, the emulsion may comprise about 1.5% amine phosphate, about 1.2% phosphoric acid, about 67.3% of the modified asphalt, and about 30% water. In some embodiments, the modified asphalt binder consists essentially of the emulsifier solution and the base asphalt, while in other embodiments other compositions or additives may also be combined with the modified asphalt binder, for example additives to aid in processing or to modify the properties of the asphalt as described in U.S. Pat. Nos. 6,117,926; 6,228,909; and 7,160,935.

For some applications such as chip seal and sand seal operations, the emulsified modified asphalt binder (e.g., any of the emulsified modified asphalt binders described above) may be at a temperature between about 40° F. (4° C.) to about 200° F. (93° C.), between about 70° F. (21° C.) to about 200° F. (93° C.), between about 100° F. (38° C.) to about 200° F. (93° C.), or between about 150° F. (66° C.) to about 200° F. (93° C.), when it is applied. About 0.2 gallons to about 0.5 gallons per square yard of the modified asphalt binder may be spread on the road surface and from about 15 pounds to about 40 pounds per square yard of fine aggregate or sand is spread over the top of the modified asphalt binder.

In other embodiments, any of the emulsified modified asphalt binders described above may be diluted, for example using additional emulsifier solution, another diluent, or with water. For example, for fog seal and tack applications, the emulsion may be diluted with the emulsifier solution, or the emulsion may be diluted further with water, resulting in a relatively thin emulsion that is applied to a road surface. In such applications, the emulsion may be diluted to between about 20% and about 45%, or between about 25% and about 35%, non-volatile components.

For other applications, the modified asphalt binder is combined with an aggregate, resulting in a modified asphalt pavement material. For example, the modified asphalt binder and the aggregate may be combined and applied (e.g., compacted) to produce pavement materials for cold mix, cold-in-place recycling, slurry seal and microsurfacing applications. For such applications, the modified asphalt binder may be lowered to a temperature such that, after mixing with the desired aggregate, the resulting modified asphalt pavement material has a desired temperature such as about 100° F. (38° C.), between about 40° F. (4° C.) and about 120° F. (49° C.), between about 50° F. (10° C.) and about 120° F. (49° C.), between about 70° F. (21° C.) and about 120° F. (49° C.), or between about 80° F. (27° C.) and about 120° F. (49° C.). In some embodiments, such a modified asphalt paving material has from about 5% to about 10% emulsified asphalt binder, with the balance being aggregate, while in other embodiments the modified asphalt paving material may have other ingredients or additives, for example additives to aid in processing or to modify the properties of the modified asphalt as described in U.S. Pat. Nos. 6,117,926; 6,228,909; and 7,160,935.

A portion, all, or substantially all, of the water from the emulsifier solution is removed after the modified asphalt binder is combined with the aggregate. The water may be removed through evaporation at ambient temperature.

The following are asphalt syntheses of experimental emulsifier solutions that were produced. Emulsions that were produced in accordance with the methods and formulations described above provided stable emulsions across a range of conditions. Asphalt emulsions are energetically unstable systems and their performance is predicated on this instability causing the emulsion to break in order for the asphalt to function as a paving material. Nevertheless, in some embodiments it is important that prior to using the emulsion for its intended purpose, the emulsion remains intact so that it can be pumped, transported, and applied in the field. A stable emulsion is one that, when allowed to cool to room temperature overnight, does not break and, when reheated to a temperature of 60° C. to 90° C. (140° F. to 194° F.) does not contain sieve greater than 0.1% as determined by ASTM D6933-08. An emulsion that does not break or develop sieve is a necessary requirement for some applications, but for many applications it is not sufficient. The relative invariance of residue properties is also needed to have a stable emulsion that is suitable for some desired applications. In some embodiments of the present invention, a stable emulsion also exhibits stable residue properties as defined by stiffness, elasticity tests, non-recovered compliance, and penetration. In contrast, emulsions produced with other mineral acids such as HCl remain stable only in a narrower range of working conditions, and in some cases may degrade the properties of the polymer- or acid-modified asphalt residue. In addition, when combining with aggregate to produce a modified asphalt paving material, the use of an amine phosphate provides paving materials that more rapidly cure and are less soft than paving materials that include other modified asphalt binders and other mineral acids, for example styrene-butadiene rubber (SBR) with HCl.

Testing that was performed for some of the asphalt syntheses includes the Multiple Stress Creep Recovery test (MSCR test), which is described in ASTM D7405-08; the Toughness and Tenacity test (T&T test), which is described in ASTM D5801-95; and the Penetration test, which is provided in ASTM D5-06. The MSCR test generally provides a recovery for the material when a certain force per unit area (typically given in kPa) is exerted on the material. The MSCR also provides Jnr, which is a measure of the non-recovered compliance of the material. All MSCR testing, unless otherwise provided, was performed at 58° C. (136° F.). The T&T test provides toughness and tenacity values, both measured in Joules. The Penetration test provides the amount of penetration resulting when a standard needle (penetration needle) load with 100 grams of mass is allowed to penetrate into an asphalt sample for 5 seconds. The results are generally expressed without units, and are well understood by those familiar with the asphalt industry; however the actual units are dmm (decimillimeters).

In all asphalt syntheses stated below the emulsion formulations are expressed as weight percent emulsifier or weight percent acid (either H3PO4 or HCl) relative to the weight of the total emulsion being produced.

Asphalt Synthesis 1

A polymer modified asphalt produced with PG 58-34 asphalt and modified with ELAVOY™ and polyphosphoric acid, was provided in non-emulsified form. This modified asphalt serves as the base for a series of emulsions. The MSCR percent recovery at a stress of 1.0 kPa was 14.33% and the percent recovery at a stress of 3.2 kPa was 4.40%. The non-recovered compliance (Jnr) was 4.185 $kPa^{-1}$ and 5.392 $kPa^{-1}$ at the two stress levels, respectfully. The same polymer modified asphalt was emulsified using an emulsifying solution of 0.25% CORSATHOX DT-3™ and 0.25% H3PO4. The fresh emulsion residue obtained by boildown had a MSCR % recovery of 13.37% and Jnr of 4.412 at 1.0 kPa and a MSCR % recovery of 6.18% and Jnr of 5.232 at 3.2 kPa. After 24 hours of 60° C. storage, the emulsion residue obtained by boildown had a MSCR % recovery of 15.09% and Jnr of 3.335 at 1.0 kPa and a MSCR % recovery of 6.09% and Jnr of 4.074 at 3.2 kPa. After 6 days of 60° C. oven storage, the emulsion residue obtained by boildown had a MSCR % recovery of 12.96% and Jnr of 3.887 at 1.0 kPa and a MSCR % recovery of 6.51% and Jnr of 4.603 at 3.2 kPa.

Asphalt Synthesis 2

An emulsifier solution was prepared by mixing 0.22% of REDICOTE 4819™ emulsifier together with 0.2% HCl. The same polymer modified asphalt used in Asphalt Synthesis 1 was emulsified with this emulsifier solution. The fresh emulsion residue obtained by boildown had a MSCR % recovery of 12.15% and Jnr of 4.029 at 1.0 kPa and a MSCR % recovery of 4.27% and Jnr of 5.003 at 3.2 kPa. After 24 hours of 60° C. oven storage, the emulsion residue obtained by boildown had a MSCR % recovery of 12.15% and Jnr of 4.095 at 1.0 kPa and a MSCR % recovery of 3.69% and Jnr of 5.119 at 3.2 kPa. After 6 days of oven storage, the emulsion residue obtained by boildown had a MSCR % recovery of 10.89% and Jnr of 4.437 at 1.0 kPa and a MSCR % recovery of 3.24% and Jnr of 5.493 at 3.2 kPa. Comparing the property changes to the emulsion residues (after the emulsions are stored at 60° C.) obtained from emulsions produced with amine phosphate to the emulsion residues obtained from emulsions produced with amine chloride shows that amine phosphate emulsion residues match or exceed the properties of the original base asphalt while the residues from the emulsions produced with the amine chloride have MSCR % recovery properties and Jnr properties that deteriorate as time passes.

Asphalt Synthesis 3

REDICOTE 4819™ was reacted with HCl, and the same polymer modified asphalt described in Asphalt Synthesis 1 was emulsified with 0.7% REDICOTE 4819™ based on the weight of the total emulsion. MSCR data yielded MSCR % recovery of 8.42% and Jnr of 4.778 at 1.0 kPa and a MSCR % recovery of 2.63% and Jnr of 5.812 at 3.2 kPa. This asphalt synthesis produced a more stable emulsion than Asphalt Synthesis 2, but still generally had lower elasticity and higher Jnr compliance compared to emulsions produced using amine phosphate emulsification chemistry as described in Asphalt Synthesis 1.

Asphalt Synthesis 4

A PG 64-34 polymer modified asphalt produced using ELVALOY™ +PPA was used as an emulsion base. This base asphalt had a MSCR % recovery of 25.1% and Jnr of 2.546 at 1.0 kPa and a MSCR % recovery of 15.1% and Jnr of 3.070 at 3.2 kPa. This base asphalt also had Toughness and Tenacity properties as measured by ASTM D5801-95 of 6.591 Joules Toughness and 5.354 Joules Tenacity. The base asphalt was emulsified using 0.25% CORSATHOX DM-3™ reacted with 0.225% H3PO4 to a solution pH of 2-2.5. The residue obtained from the emulsion after 1 day of storage at 60° C. using a vacuum distillation procedure based on ASTM D7403-09 had. MSCR % recovery of 23.7% and Jnr of 2.795 at 1.0 kPa and a MSCR % recovery of 16% and Jnr of 3.352 at 3.2 kPa. This residue also had Toughness and Tenacity properties as measured by ASTM D5801-95 of 6.936 Joules Toughness and 5.069 Joules Tenacity. The residue obtained from the emulsion after 7 days of storage at 60° C. using a vacuum distillation procedure based on ASTM D7403-09 had MSCR % recovery of 24.6% and Jnr of 3.190 at 1.0 kPa and a MSCR % recovery of 16.6% and Jnr of 3.770 at 3.2 kPa. This residue also had Toughness and Tenacity properties as measured by ASTM D5801-95 of 8.15 Joules Toughness and 6.12 Joules Tenacity. FIG. 1 shows Toughness and Tenacity testing for the asphalts of Asphalt Synthesis 4. While the values of the Toughness and Tenacity are important, the shape of the curves after the initial peak in the curve is an indicator of how well the elasticity of the binder is preserved. FIG. 1 shows maintenance of load for a period after the initial peak. The general rounded shape of the curve is an indication that elasticity has been maintained. The shape of these curves highlights that both the base asphalt binder and the emulsified asphalt binder exhibit good elasticity.

Asphalt Synthesis 5

Figure 2:
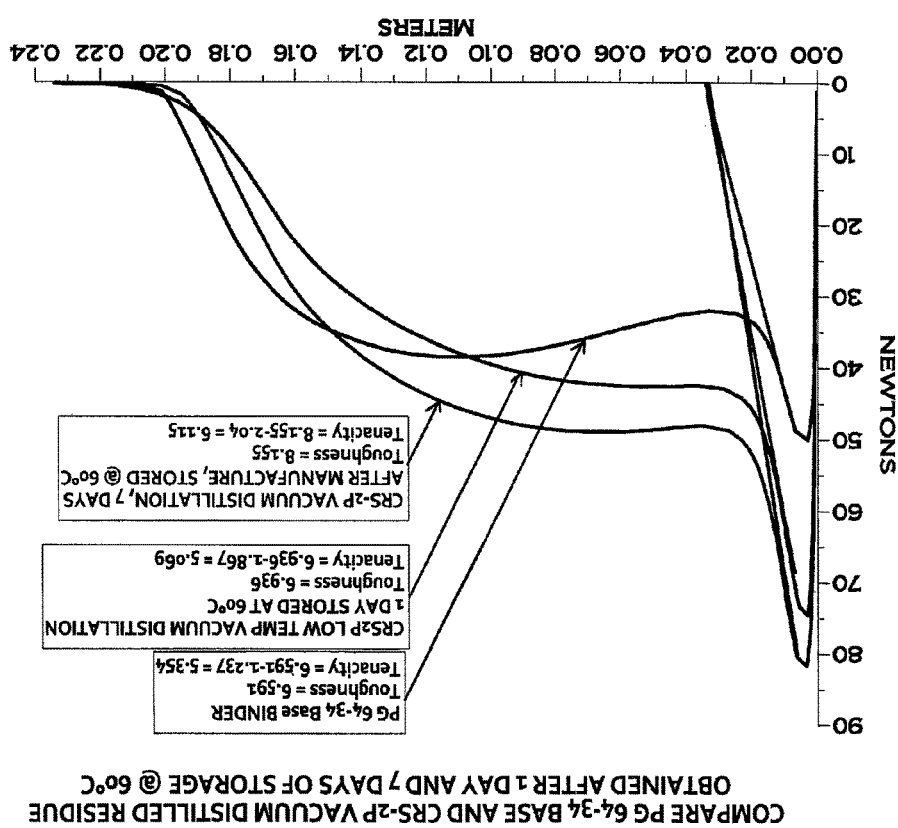

As a comparison to Asphalt Synthesis 4, the base asphalt described in Asphalt Synthesis 4 was emulsified using 0.25% REDICOTE E-4819™ reacted with 0.225% HCl to a solution pH of 2-2.5. The residue obtained from the emulsion after 1 day of storage at 60° C. using a vacuum distillation procedure based on ASTM D7403-09 had a MSCR % recovery of 16.7% and Jnr of 3.672 at 1.0 kPa and a MSCR % recovery of 10.2% and Jnr of 4.375 at 3.2 kPa. This residue also had Toughness and Tenacity properties as measured by ASTM D5801-9 of 6.691 Joules Toughness and 5.146 Joules Tenacity. The residue obtained from the emulsion after 5 days of storage at 60° C. using a vacuum distillation procedure based on ASTM D7403-09 had. MSCR % recovery of 18.1% and Jnr of 3.737 at 1.0 kPa and a MSCR % recovery of 10.5% and Jnr of 4.513 at 3.2 kPa. This residue also had Toughness and Tenacity properties as measured by ASTM D5801-95 of 7.629 Joules Toughness and 5.202 Joules Tenacity. An analysis of the results presented in Asphalt Syntheses 4 and 5 demonstrate that the emulsions produced using this invention have residue properties that are maintained at a higher level than those emulsions which are produced using classical amine chloride chemistry. FIG. 2 shows Toughness and Tenacity testing for the asphalts of Asphalt Synthesis 5. When the curves in FIG. 2 are viewed in comparison to those in FIG. 1, FIG. 2 indicates a certain amount of elasticity, but beyond 0.14 meters the sample gradually weakens and fails compared to the base asphalt curve in FIG. 1. For the base asphalt and for both amine phosphate samples in FIG. 1 the failure is rather abrupt indicating a tough, strong material. In contrast, the curve 2 plot in FIG. 2 exhibits a steady decline in load after the initial peak which is indicative of a weakening elasticity in the binder.

Asphalt Synthesis 6

An emulsifier solution was prepared by mixing 1.5% of C-450 emulsifier together with 1.5% hydrochloric acid. A cationic slow set asphalt binder using 64-28P asphalt binder modified with ELVALOY™ +PPA was emulsified using the C-450-based emulsifier solution described above. The fresh emulsion residue obtained by boildown had a MSCR % recovery of 15.79% and Jnr of 1.972 at 1.0 kPa and a MSCR % recovery of 9.00% and Jnr of 2.307 at 3.2 kPa. After 5 days of 60° C. oven storage, the emulsion residue obtained by boildown had a MSCR % recovery of 13.33% and Jnr of 2.236 at 1.0 kPa and a MSCR % recovery of 7.59% and Jnr of 2.676 at 3.2 kPa. In comparison the same base asphalt was emulsified using 1.5% REDICOTE C-450™ polyamine reacted with 1.5% H3PO4 to produce a cationic slow set emulsion. The fresh emulsion residue obtained by boildown had a MSCR % recovery of 29.45% and Jnr of 1.305 at 1.0 kPa and a MSCR % recovery of 12.18% and Jnr of 2.040 at 3.2 kPa. After 5 days of storage at 60° C., the emulsion residue obtained by boildown had a MSCR % recovery of 31.44% and Jnr of 1.309 at 1.0 kPa and a MSCR % recovery of 11.77% and Jnr of 2.221 at 3.2 kPa. This Asphalt Synthesis shows that cationic slow set emulsion residues obtained from emulsions produced using amine phosphate chemistry maintain and improve both % recovery properties and non-recovered compliance relative to residues obtained from emulsions produced using classic amine chloride chemistry. In fact this Asphalt Synthesis shows that the amine chloride residues degrade relative to the amine phosphate derived residues.

Asphalt Synthesis 7

REDICOTE 4819™ was reacted with phosphoric acid, and the same polymer modified asphalt described in Asphalt Synthesis 1 was emulsified with 0.22% Redicote 4819 based on the weight of the total emulsion. MSCR data yielded MSCR % recovery of 16.07% and Jnr of 3.745 at 1.0 kPa and a MSCR % recovery of 4.98% and Jnr of 4.973 at 3.2 kPa. This Asphalt Synthesis produced a more stable emulsion than Asphalt Synthesis 2, but still generally had lower elasticity and higher stiffness compared to emulsifiers using phosphorous based acids described herein.

Asphalt Synthesis 8

An emulsifier solution was prepared by mixing 0.25 wt % by weight of total emulsion of CORSATHOX DM-3™ emulsifier with 0.225 wt % H3PO4 by weight of total emulsion. The pH was in the range of 2.0-2.5. CRS-2M emulsion (using PG 64-34 asphalt binder modified with ELVALOY™ +PPA was produced. After 24 hours of oven storage at 60° C., the emulsion residue obtained by vacuum distillation following methods described in ASTM D7403-09 had a MSCR % recovery of 17.9% and Jnr of 3.316 at 1.0 kPa and a MSCR % recovery of 8.5% and Jnr of 4.108 at 3.2 kPa. Also after 24 hours, the toughness was 4.123 Joules, the tenacity was 2.307 Joules. After 6 days of oven storage at 60° C., the emulsion residue obtained by vacuum distillation following methods described in ASTM D7403-09 had a MSCR % recovery of 17.1% and Jnr of 3.888 at 1.0 kPa and a MSCR % recovery of 7.6% and Jnr of 4.871 at 3.2 kPa. Also after 6 days, the toughness was 4.904 Joules, the tenacity was 2.711 Joules. This Asphalt Synthesis shows that using amine phosphate as an emulsifier provides a material with consistent properties over time.

Asphalt Synthesis 9

An emulsifier solution was prepared by mixing 2% C-320 emulsifier with 2.4% phosphoric acid both by weight total emulsion. A polymer modified asphalt comprising 70-22 asphalt binder modified with ELAVOY™ and polyphosphoric acid was also provided. The polymer modified asphalt was emulsified with the emulsifier solution to yield an emulsion After 3 days, the emulsion had a MSCR % recovery of 45.3% and Jnr of 0.631 at 1.0 kPa and a MSCR % recovery of 30.4% and Jnr of 0.836 at 3.2 kPa. This compares to base polymer modified asphalt (not emulsified) having a MSCR % recovery of 33.3% and Jnr of 1.788 at 1.0 kPa and a MSCR % recovery of 16.3% and Jnr of 2.401 at 3.2 kPa.

Asphalt Synthesis 10

A PG 64-28 was produced from a PG 58-28+ the addition of 0.75% by wt PPA. This asphalt binder was emulsified with a solution of 1% CORSATHOX DT-3™ by weight of finished emulsion and sufficient 65% H3PO4 to achieve a solution pH of 2 to 2.5. The original base asphalt had a stiffness at 64° C. of 1.650 kPa as determined by ASTM D7175-08. The boildown residue after 1 day of oven storage at 60° C. had a stiffness at 64° C. of 1.77 kPa and after 2 days of 60° C. storage the stiffness of the boildown residue was 1.71 kPa. This Asphalt Synthesis shows that for a binder produced with PPA as the sole modifier that an amine phosphate derived emulsion has residue stiffness properties at least as good as the original base asphalt.

Asphalt Synthesis 11

A PG 70-22 polymer modified asphalt was produced with SBS+PPA and emulsified with a solution of 0.25% REDICOTE E-6™ reacted with 0.22% H3PO4, both expressed by weight of total emulsion, to a pH of 2.25. The base asphalt when tested at 64° C. had a MSCR % recovery of 30.7% and Jnr of 1.698 at 1.0 kPa and a MSCR % recovery of 12.4% and Jnr of 2.358 at 3.2 kPa. One day after production and maintaining the emulsion at room temperature overnight and reheating to 60° C. the emulsion had a sieve content of 0.08% (specification maximum of 0.1%) as determined by ASTM D6933-08. Also one day after production the evaporation residue of the emulsion when tested at 64° C. had a MSCR % recovery of 35.9% and Jnr of 1.583 at 1.0 kPa and a MSCR % recovery of 17.3% and Jnr of 2.195 at 3.2 kPa. Two days after production the evaporation residue of the emulsion, which had been stored at 60° C. overnight, when tested at 64° C. had a MSCR % recovery of 35.5% and Jnr of 1.599 at 1.0 kPa and a MSCR % recovery of 17.0% and Jnr of 2.188 at 3.2 kPa. These data show that the residue of emulsion produced using amine phosphate chemistry has properties better than those of the original binder and shows no deterioration over a two day time period.

Asphalt Synthesis 12

A boiling water stripping test was also run on several different emulsified asphalt binders. A boiling water stripping test is described in ASTM D3625-96, Effect of Water on Bituminous-Coated Aggregate Using Boiling Water. The method calls for boiling 250 grams of mix in distilled water for 10 min prior to decanting the water and examining the mix. Due to lack of emulsion for testing, 100 grams of gravel chip material was mixed with 6.5 grams of water at room temperature. 10 grams of emulsion that had been maintained at 140° F. was added to the damp aggregate and mixed and coated the gravel chips with the emulsion. The moisture was then boiled off the gravel chips and the resulting coated material was placed in 200 grams of distilled water and brought to a boil for 15 minutes. The gravel chips were then visually inspected to ensure that the coating had remained on the gravel chips. The same base asphalt from Asphalt Synthesis 4 was used as the base asphalt. In a first sample, the base asphalt was emulsified with 0.25% DM-3 that had been treated with phosphoric acid, based on the total weight of the emulsion and in a second sample the base asphalt was emulsified with 0.25% REDICOTE 4819™ that had been treated with HCl. Neither sample showed any stripping after being exposed to the stripping test.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The invention claimed is:

1. An emulsified asphalt binder material comprising a stable emulsion formed from a phosphoric acid-modified or mineral acid-modified asphalt binder, an amine phosphate, and water.

2. The emulsified asphalt binder material of claim 1, wherein the acid-modified asphalt binder is also a polymer-modified asphalt binder.

3. The emulsified asphalt binder material of claim 2, wherein the acid-modified and polymer-modified asphalt binder has been modified by a terpolymer including ethylene, butyl acrylate and glycidyl methacrylate monomers, a polymer including ethylene and glycidyl methacrylate monomers, a styrene-butadiene-styrene polymer, a styrene-butadiene polymer, or mixture thereof.

4. The emulsified asphalt binder material of claim 1, wherein the amine phosphate comprises an ethoxylated tallow diamine phosphate or a polyamine phosphate.

5. The emulsified asphalt binder material of claim 1, wherein the stable emulsion comprises 0.1 wt % to 2.5 wt % amine phosphate by weight of the emulsion.

6. The emulsified asphalt binder material of claim 1, wherein the stable emulsion preserves or increases the percent recovery, non-recovery compliance, elasticity, and stiffness properties of the acid-modified asphalt binder compared to the acid-modified asphalt binder before emulsification.

7. A pavement made using aggregate and an emulsified asphalt binder material comprising a stable emulsion formed from a phosphoric acid-modified or mineral acid-modified asphalt binder, an amine phosphate, and water.

8. The pavement of claim 7, wherein the acid-modified asphalt binder is also a polymer-modified asphalt binder.

9. The pavement of claim 7, wherein the polymer-modified asphalt binder has been modified by a terpolymer including ethylene, butyl acrylate and glycidyl methacrylate monomers, a polymer including ethylene and glycidyl methacrylate monomers, a styrene-butadiene-styrene polymer, a styrene-butadiene polymer, or mixture thereof.

10. The pavement of claim 7, wherein the amine phosphate comprises an ethoxylated tallow diamine phosphate or a polyamine phosphate.

11. The pavement of claim 7, wherein the stable emulsion comprises 0.1 wt % to 2.5 wt % amine phosphate by weight of the emulsion.

12. A method of forming an emulsified asphalt binder material comprising:
forming an acid-modified base asphalt binder by combining an asphalt binder and phosphoric acid or mineral acid, mixing an amine compound and a phosphorous-based acid in water to form an emulsifier solution including an amine phosphate, and mixing the base asphalt binder and the emulsifier solution in high shear dispersion equipment to shear the asphalt binder into fine particles and form the emulsified asphalt binder material; or
adding an amine compound to an asphalt binder to form an amine-treated asphalt binder, contacting the amine-treated asphalt binder with a mixture of phosphoric acid or mineral acid and water required to react with the amine compound in high shear dispersion equipment to form an amine phosphate or mineral acid salt in situ as the asphalt binder is sheared into fine particles and the amine phosphate or mineral acid and asphalt binder form the emulsified asphalt binder material.

13. The method of claim 12, wherein the emulsified asphalt binder material is produced by forming an acid-modified base asphalt binder by combining an asphalt binder and phosphoric acid, mixing an amine compound and a phosphorous-based acid in water to form an emulsifier solution including an amine phosphate, and mixing the base asphalt binder and the emulsifier solution to form the emulsified asphalt binder material.

14. The method of claim 12 wherein the acid-modified base asphalt binder is formed by combining an asphalt binder, phosphoric acid, and a polymer modifier.

15. The method of claim 12, wherein the amine compound is an ethoxylated tallow diamine or a polyamine.

16. The method of claim 12, wherein the asphalt binder comprises an acid-modified and polymer-modified asphalt binder.

17. The method of claim 16, wherein the acid-modified and polymer-modified asphalt binder has been modified by a terpolymer including ethylene, butyl acrylate and glycidyl methacrylate monomers, a polymer including ethylene and glycidyl methacrylate monomers, a styrene-butadiene polymer, a styrene-butadiene-styrene polymer, or mixture thereof.

18. The method of claim 12, further comprising the step of applying the emulsified asphalt binder material to a road surface and applying a fine aggregate or sand over the emulsified asphalt binder material.

19. The method of claim 12, further comprising the step of diluting the emulsified asphalt binder material to between about 20%-45% non-volatile components to form a diluted emulsion and applying the diluted emulsion to a road surface.

20. The method of claim 12, further comprising the steps of mixing the emulsified asphalt binder material with an aggregate to form a paving material, applying the paving material to a surface, and compacting the applied paving material.

* * * * *